US009253457B2

(12) United States Patent
Okaniwa

(10) Patent No.: US 9,253,457 B2
(45) Date of Patent: Feb. 2, 2016

(54) IMAGE PROCESSING APPARATUS, PROJECTION APPARATUS, AND COMPUTER READABLE MEDIUM

(71) Applicant: CASIO COMPUTER CO., LTD., Shibuya-ku, Tokyo (JP)

(72) Inventor: Shoichi Okaniwa, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 192 days.

(21) Appl. No.: 14/067,700

(22) Filed: Oct. 30, 2013

(65) Prior Publication Data

US 2014/0132845 A1 May 15, 2014

(30) Foreign Application Priority Data

Nov. 12, 2012 (JP) ................................. 2012-248221

(51) Int. Cl.
*G03B 21/14* (2006.01)
*H04N 9/31* (2006.01)
*G09F 27/00* (2006.01)

(52) U.S. Cl.
CPC ............ *H04N 9/3185* (2013.01); *G03B 21/147* (2013.01); *G09F 27/00* (2013.01); *H04N 9/3194* (2013.01)

(58) Field of Classification Search
CPC ...... G03B 21/147; G03B 21/14; G09F 27/00; H04N 9/31285; H04N 9/3194; H04N 9/31; H04N 9/3185
USPC ..................................................... 353/71, 122
See application file for complete search history.

(56) References Cited

U.S. PATENT DOCUMENTS

| 8,487,940 B2 | 7/2013 | Kohno et al. | |
| 2004/0036717 A1* | 2/2004 | Kjeldsen et al. | 345/730 |
| 2011/0310310 A1* | 12/2011 | Lassila et al. | 348/744 |

FOREIGN PATENT DOCUMENTS

| JP | 2011097447 A | 5/2011 |
| JP | 2011-150221 A | 8/2011 |
| JP | 2011164277 A | 8/2011 |
| JP | 2011223572 A | 11/2011 |
| JP | 2012173683 A | 9/2012 |

OTHER PUBLICATIONS

Japanese Office Action dated Jan. 27, 2015, issued in counterpart Japanese Application No. 2012-248221.

\* cited by examiner

*Primary Examiner* — William C Dowling
*Assistant Examiner* — Ryan Howard
(74) *Attorney, Agent, or Firm* — Holtz, Holtz & Volek PC

(57) ABSTRACT

An image processing apparatus includes: a storage section to store a projection image to be used for projecting a video content on a screen; an imaging section to image an audience looking at the screen; a detecting section to detect a direction of the audience from an imaged image which is imaged by the imaging section; and a correcting section to correct the projection image, on the basis of the direction of the audience, so that a projected image of the video content is directed to the audience.

10 Claims, 9 Drawing Sheets

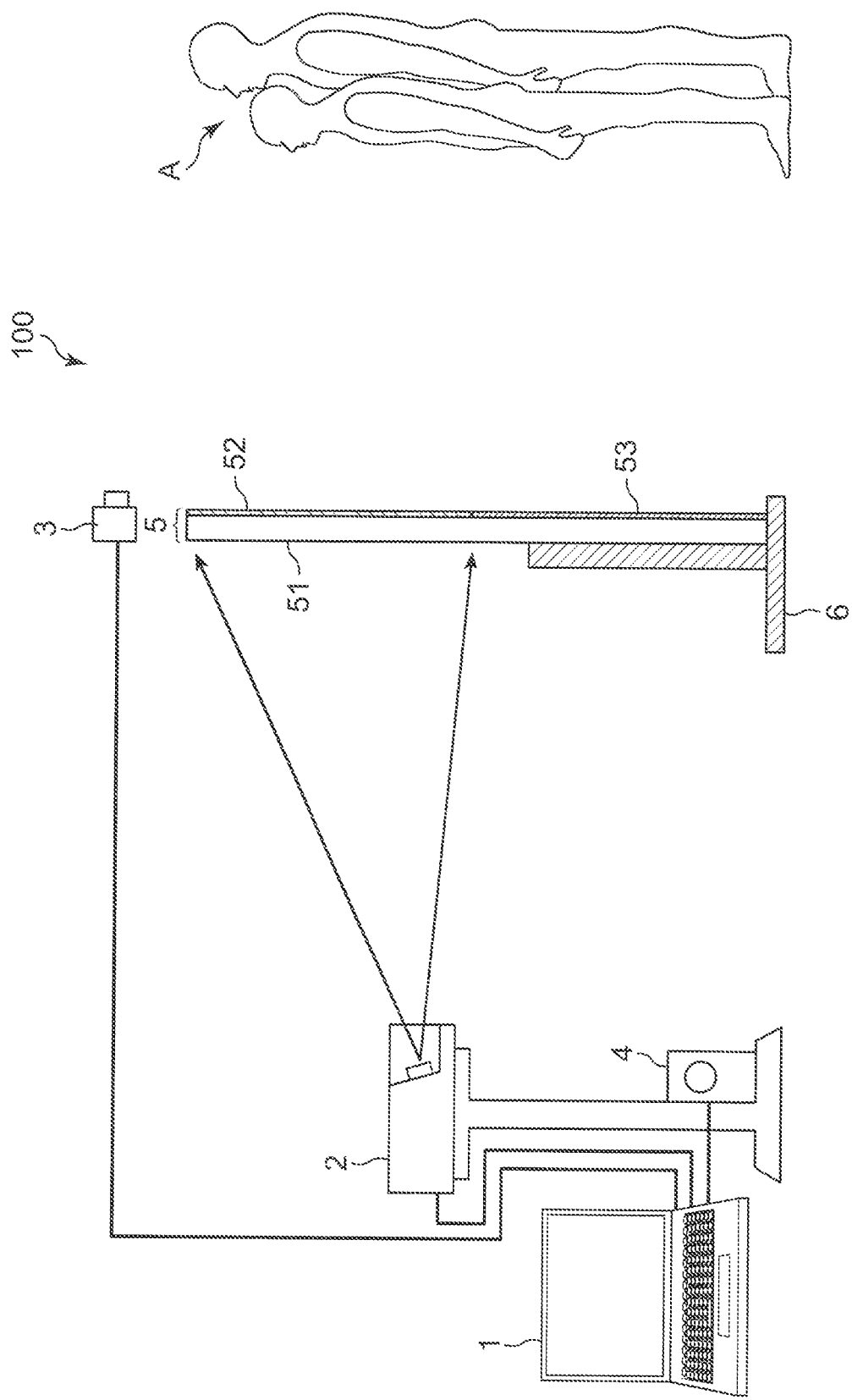

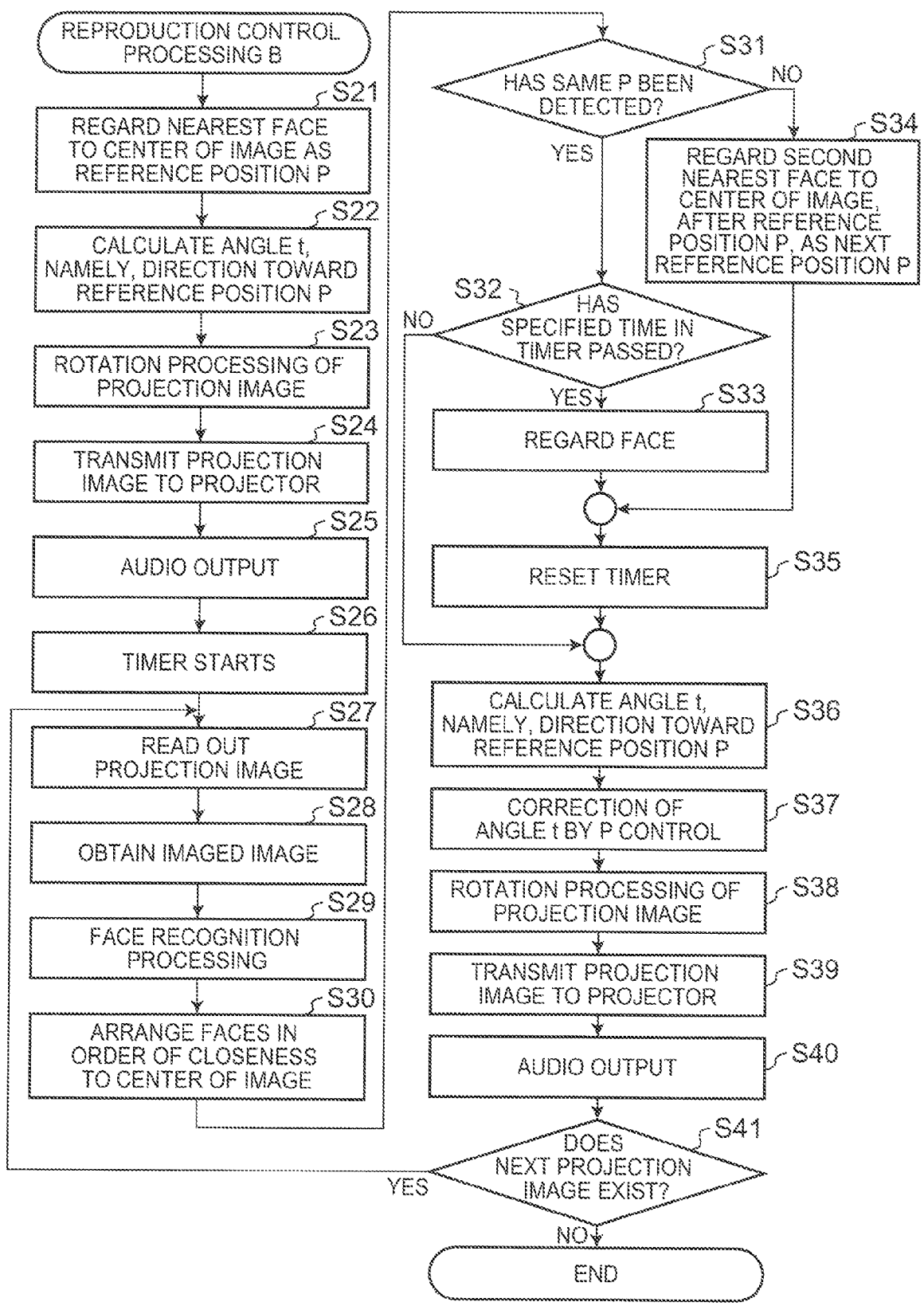

IMAGE PROCESSING APPARATUS, PROJECTION APPARATUS, AND COMPUTER READABLE MEDIUM

CROSS-REFERENCE TO RELATED APPLICATIONS

This application is based upon and claims the benefit of priority from the prior Japanese Patent Application No. 2012-248221 filed on Nov. 12, 2012, the entire contents of which are incorporated herein by reference.

FIELD OF THE INVENTION

The present invention relates to an image processing apparatus, a projection apparatus, and computer readable medium.

BACKGROUND OF THE INVENTION

Heretofore, a projection apparatus has been used for projecting images of human beings and the like onto a screen for providing an explanation about commercial products, etc.

Recently, so-called "virtual mannequin" has been proposed in order to improve an impression given to customers and/or viewers, which mannequin is obtained by projecting video contents onto a human-shaped projection screen, which content has a shape conforming to an outer shape of the screen (for example, see Japanese Patent Application Laid-Open Publication No. 2011-150221). By the virtual mannequin, there can be obtained a projected image which exerts a sense of a presence as if a human is standing there. The virtual mannequin is utilized for performance of an innovative and effective display in an exhibition, etc.

However, the projected image, which is projected on the screen, faces forward regardless of where audiences such as the customers and viewers are, when providing such explanation. Accordingly, the projection image gives them the feeling that it is flat, and thereby it lacks persuasiveness, and an effective performance effect has not been obtained.

The present invention has been made in view of the above circumstances, and the object of the present invention is to improve the performance effect by performing projection while taking account of positions where the audiences are standing.

SUMMARY

According to an aspect of the present invention, there is provided an image processing apparatus including: a storage section to store a projection image to be used for projecting a video content on a screen; an imaging section to image an audience looking at the screen; a detecting section to detect a direction of the audience from an imaged image which is imaged by the imaging section; and a correcting section to correct the projection image, on the basis of the direction of the audience, so that a projected image of the video content is directed to the audience.

BRIEF DESCRIPTION OF THE DRAWINGS

A more complete understanding of this application can be obtained when the following detailed description is considered in conjunction with the following drawings, in which:

FIG. 1 is a diagram illustrating an overall configuration example of a content reproduction system according to this embodiment;

FIG. 9 is a flowchart for illustrating reproduction control processing B to be executed in the control section illustrated in FIG. 3.

DETAILED DESCRIPTION OF THE PREFERRED EMBODIMENT

Hereinafter, preferred embodiments of the present invention will be described with reference to the attached drawings. Incidentally, the present invention is not limited to illustrated examples.

[First Embodiment]
<Configuration of Content Reproduction System 100>

A content reproduction system 100 according to this embodiment is a system which projects a video content/contents on a screen 5 formed into a shape of a projection object contained in the video content. In the embodiment, for example, the video content is a video in which the projection object, such as a human being, character, and animal, provides an explanation of commercial products and the like.

Figure 2A:
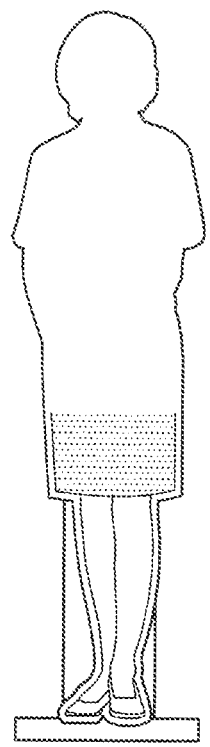
FIG. 2A is a front view of the content reproduction system before projecting a video.
Figure 2B:
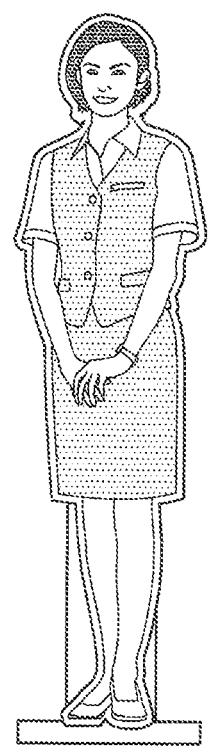
FIG. 2B is a front view of the content reproduction system during video projection.

FIGS. 1, 2A and 2B illustrate schematic configurations of the content reproduction system 100. FIG. 1 is a side view of the content reproduction system 100, and FIGS. 2A and 2B are front views of the content reproduction system 100. FIG. 2A is the front view before projecting the video, and FIG. 2B is the front view during video projection. Incidentally, in FIG. 1, audiences A are illustrated with the content reproduction system 100, for illustrating a positional relationship between each component of the content reproduction system 100 and the audiences A of the video content.

As illustrated in FIG. 1, the content reproduction system 100 is configured to include an image processing apparatus 1, a projector 2, a camera 3, a speaker 4, a screen 5, and so on. The projector 2, the camera 3 and the speaker 4 are connected to the image processing apparatus 1.

The image processing apparatus 1 is an apparatus which corrects a projection image (frame image) of each frame of the video content so that the projected image, which is projected on the screen 5, faces to the position where the audiences A are. As the image processing apparatus 1, for example, a Personal Computer (PC), a terminal apparatus, etc. can be adopted.

Incidentally, there can be both cases that one audience A exists and that a plurality of audiences A exist.

Figure 3:
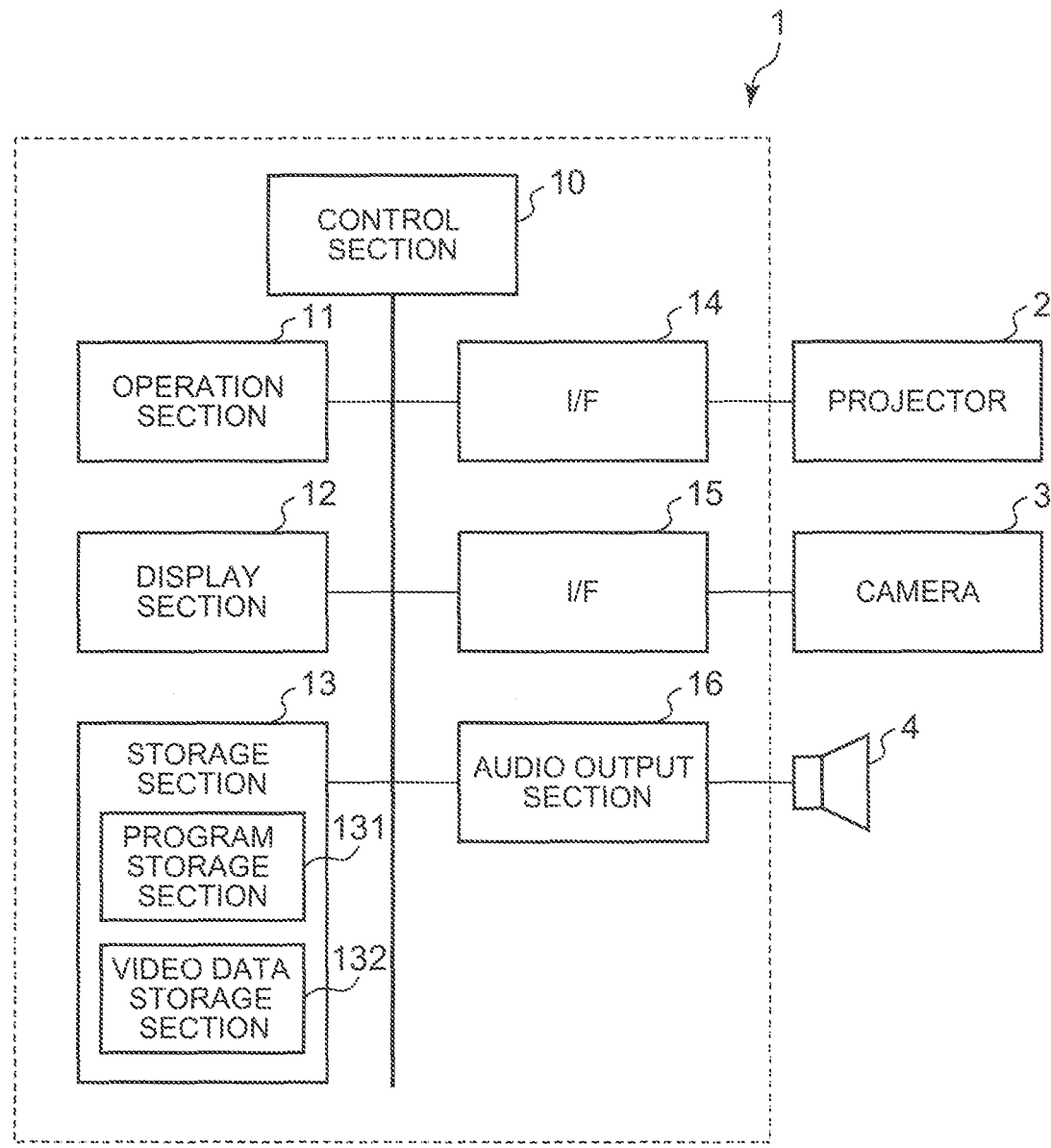
FIG. 3 is a block diagram illustrating a functional configuration of an image processing apparatus illustrated in FIG. 1.

FIG. 3 illustrates an example of a functional configuration of the image processing apparatus 1. As illustrated in FIG. 3, the image processing apparatus 1 is configured to include a control section 10, an operation section 11, a display section 12, a storage section 13, an I/F 14, an I/F 15, an audio output section 16, and so on.

The control section 10 includes a Central Processing Unit (CPU), a Random Access Memory (RAM), and so on, though illustrations thereof are omitted. The CPU of the control section 10 reads out programs stored in a program storage section 131 of the storage section 13, expands the programs in a work area of the RAM, and executes various processes including later-described reproduction control processing, according to the expanded programs. The RAM of the control section 10 is a volatile memory, and has the work area in which various programs to be executed by the CPU, data relevant to the various programs, etc. are stored.

The control section 10 functions as a detecting section, a correcting section, and a face recognition processing section, by executing the reproduction control processing.

The operation section 11 includes various function keys, cursor keys, etc. to receive key inputs by a user to output obtained operation information to the control section 10.

The display section 12 is composed of a Liquid Crystal Display (LCD) and so on, and performs various displays according to display control signals from the control section 10.

The storage section 13 is composed of a Hard Disk Drive (HDD), a semiconductor non-volatile memory, etc. As illustrated in FIG. 3, the storage section 13 includes the program storage section 131 and a video data storage section 132.

The program storage section 131 stores system programs and various processing programs to be executed in the control section 10, data necessary for executing these programs, and so on. The programs are stored in form of computer readable program codes in the program storage section 131. The control section 10 successively executes operations according to the program codes.

The video data storage section 132 stores video data of projection video contents. The video data are composed of projection image data of each frame constituting moving image data of a three-dimensional model, and audio data corresponding to each projection image. The three-dimensional model means an image of a three-dimensional object which is composed of three-dimensional polygons, three-dimensional curved surfaces, texture images, etc. In the video data storage section 132, the projection image in which the projection object contained in the video content faces forward is stored.

The I/F 14 is an interface for being connected to the projector 2 to perform data transmission/reception therewith.

The I/F 15 is an interface for being connected to the camera 3 to perform data transmission/reception therewith.

To the audio output section 16, the speaker 14 is connected. The audio output section 16 converts audio data, which has been instructed by the control section 10, into audio signals to output the same from the speaker 4.

The projector 2 is a rear projection type projection apparatus which projects the video content from the rear side of the screen 5 on the basis of the projection image transmitted from the image processing apparatus 1. As the projector 2, for example, there can be adopted a Digital Light Processing (DLP) (registered trademark) projector which utilizes a Digital Micromirror Device (DMD). The DMD is a display element including a plurality of micromirrors (in the case of XGA, horizontal row: 1024 pixels×vertical row: 768 pixels) arranged in an array, and forms an optical image by reflected light from the micromirrors by performing display operation by individually switching on/off states of inclination angles of the micromirrors at high speed on the basis of the projection image. By turning on the micromirrors at positions corresponding to the region of the projection object in the projection image, and turning off the micromirrors in the other regions, only the projection object can be projected on the screen 5.

The camera 3 is an imaging section to image the audiences A who look at the screen 5. The camera 3 is placed immediately above the screen 5 so that an optical axis of the camera 3 is along a direction (later-described Wz direction) perpendicular to a surface of the screen 5. The camera 3 images objects located in front of the screen 5 according to an instruction from the image processing apparatus 1, and transmits the obtained imaged image to the image processing apparatus 1 through the I/F 15.

The screen 5 is supported by a support rack 6 so as to be perpendicular to a floor surface, and placed at a position where the screen 5 is irradiated with light output from the projector 2. As illustrated in FIG. 1, the screen 5 is constructed by attaching a rear-projection screen film 52 on an upper portion of a front surface of a base material 51 such as transparent acrylic plate, which material is formed into the shape of the projection object, and attaching a film 53 on a lower portion of the front surface of the base material 51, on which film a lower body of the projection object is printed. By using commercially available screen film having high luminance and high contrast, the projected image, which is being projected on the screen 5, can be visually recognized even in daytime brightness or in bright living room.

Incidentally, though the content reproduction system 100 of the embodiment has the configuration to project the video content of the upper body of the projection object on the screen 5, it is also possible to adopt a configuration where the rear-projection screen film 52 is attached to a whole surface of the base material 51 of the screen 5 so that the video content of an entire body of the projection object can be projected on the screen 5.

<Screen Coordinate System and Camera Coordinate System>

Coordinate systems, which are used for specifying a position/direction in the content reproduction system 100, include a screen coordinate system and a camera coordinate system.

The screen coordinate system is a coordinate system with reference to the screen 5.

Figure 4:
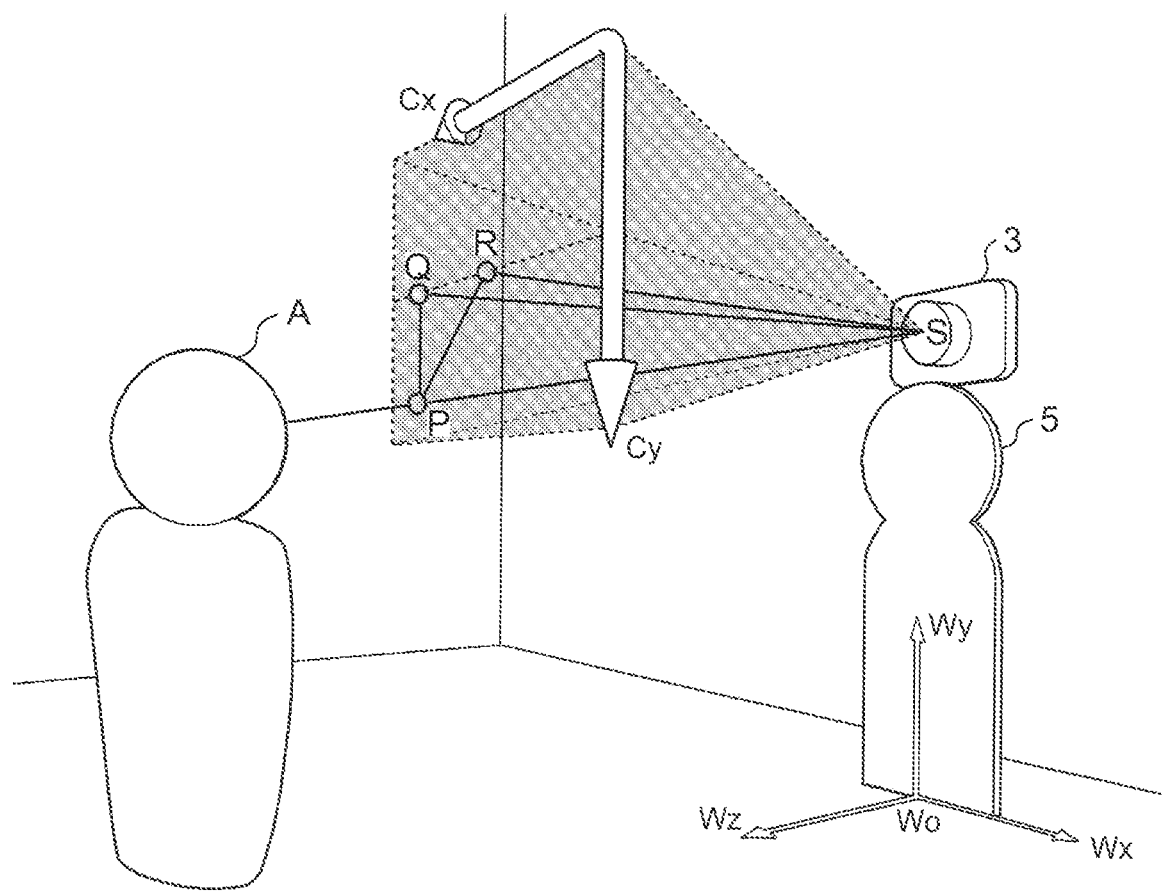
FIG. 4 is a diagram for explaining a screen coordinate system and a camera coordinate system.

As illustrated in FIG. 4, the screen coordinate system is defined as below.

Wo: origin of screen coordinate system; intersection between the central axis of the screen 5 and the installation location (floor surface)

Wx: x axis of screen coordinate system, which is in direction of exterior product of Wy and Wz, and in which a right-hand direction as seen from the audiences A is a plus(+) direction Wy: y axis of screen coordinate system, which is along the central axis of the screen 5, and in which an upper direction as seen from the audiences A is a plus(+) direction Wz: Z axis of screen coordinate system, which is perpendicular to the projection surface of the screen 5, and in which an anterior direction (direction of the audiences A) of the screen 5 is a plus(+) direction For example, coordinates of the projected image of the video content to be projected on the screen 5, and/or coordinates of the projection image to be used for projecting such projected image, are presented by the screen coordinate system.

The camera coordinate system is a coordinate system with reference to pixels of the imaged image which is imaged by the camera 3. As illustrated in FIG. 4, the camera 3 is placed immediately above the screen 5 so that when assuming that the center position of the lens of the camera is S, x coordinate of S in the screen coordinate system becomes zero(0). The lens of the camera is oriented in the direction along Wz, and is fixed so as not to be unintentionally shaken.

Figure 5:
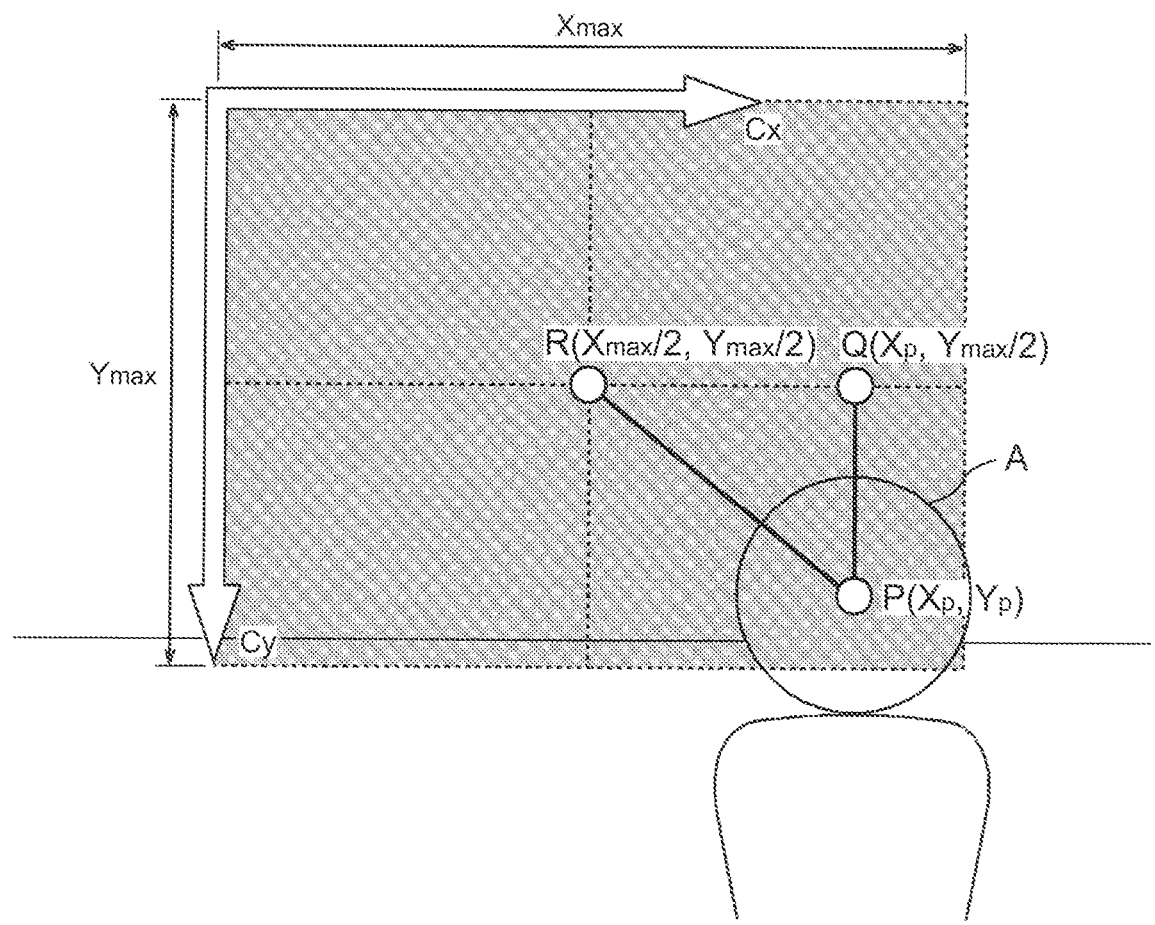
FIG. 5 is a diagram for explaining the camera coordinate system.

The camera coordinate system is defined as illustrated in FIGS. 4 and 5. FIG. 5 is a diagram illustrating view found anterior to the lens of the camera 3.

Cx: x axis of camera coordinate system, which is in x direction (traverse direction) of pixels of the imaged image which is imaged by the camera 3, and in which a plus(+) direction is opposite to that of Wx Cy: y axis of camera coordinate system, which is in y direction (longitudinal direction) of pixels of the imaged image which is imaged by the camera 3, and in which a plus(+) direction is opposite to that of Wy It is assumed that in a field of view of the camera 3, an angle of view in a horizontal direction is $T_{max}$, and that $t_{max}=T_{max}/2$. Additionally, when assuming that the resolution of the imaged image which is imaged by the camera 3 is ($X_{max}$, $Y_{max}$), as illustrated in FIG. 5, the camera 3 can take an image within a region of $0<x<X_{max}$ and $0<y<Y_{max}$. As the imaged image has a rectangle shape, the region to be in the imaged image taken by the camera 3 is a region of a gray quadrangular pyramid illustrated in FIG. 4 (also in the following drawings, the range to be in the imaged image is illustrated with the gray color). The coordinates of the region to be in the imaged image, as well as the coordinates of the pixel positions of the imaged image, are represented by the camera coordinate system.

The control section 10 of the image processing apparatus 1 executes the reproduction control processing to be described later by using the above-described screen coordinate system and the camera coordinate system.

<Operation of the Image Processing Apparatus 1>

Next, the operation in the embodiment will be described.

Figure 6:
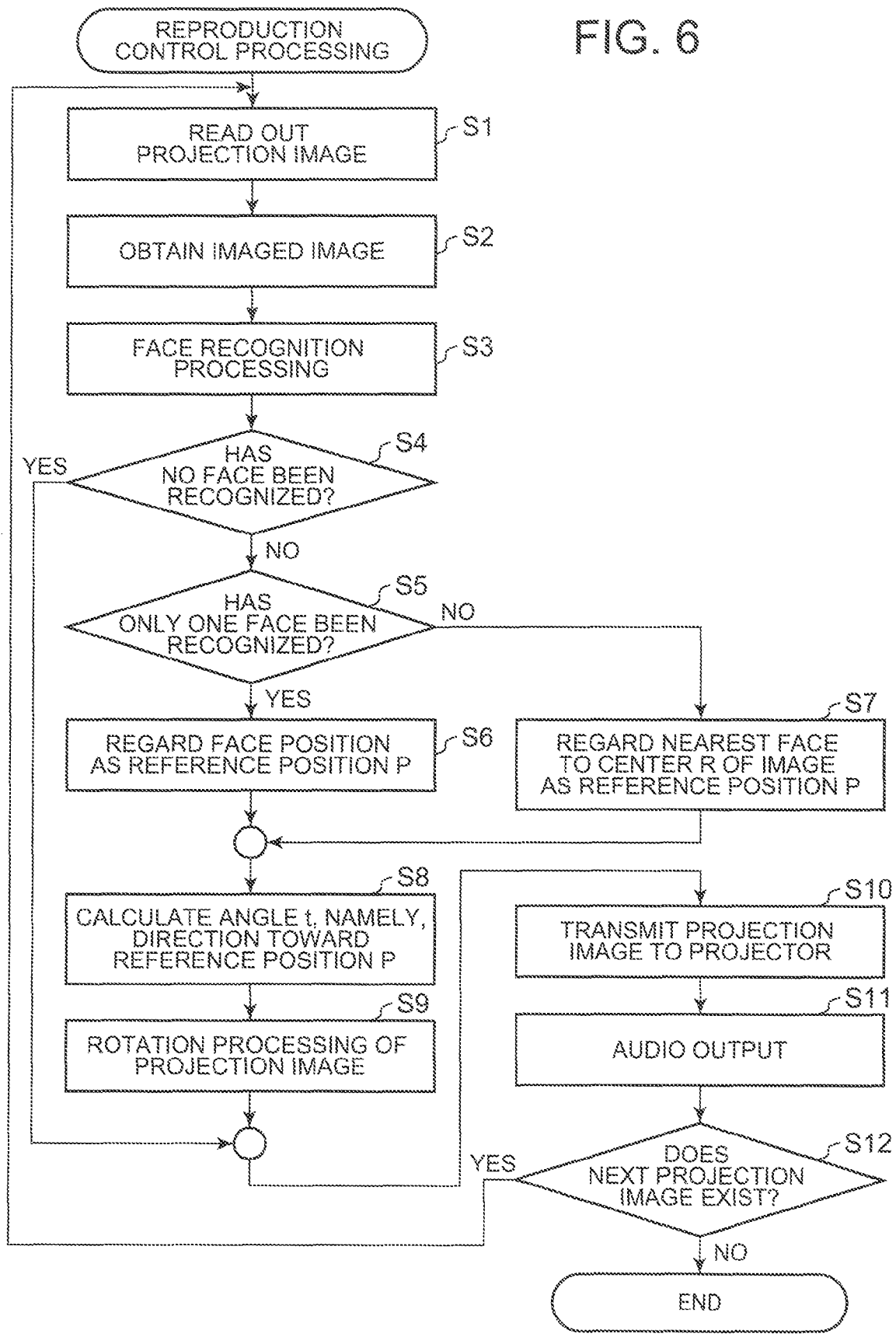
FIG. 6 is a flowchart illustrating reproduction control processing to be executed in a control section illustrated in FIG. 3.

FIG. 6 illustrates the flowchart of the reproduction control processing to be executed by the image processing apparatus 1. The reproduction control processing is executed in cooperation with the CPU of the control section 10 and the programs stored in the program storage section 131.

In the reproduction control processing, firstly, the control section 10 reads out the projection image of the projection object in the video content from the video data storage section 132 of the storage section 13 (Step S1).

Then, the control section 10 causes the camera 3 to image the audiences A looking at the screen 5 to obtain the imaged image of the audiences A (Step S2).

Next, the control section 10 performs face recognition processing to the obtained imaged image to recognize a face area/areas from the imaged image (Step S3). To the face recognition processing, for example, known image processing techniques such as Viola-Jones method using AdaBoost can be applied.

When no face area is recognized as a result of the face recognition processing (Step S4; YES), the control section 10 makes a shift to the processing of Step S10.

When only one(1) face area is recognized as the result of the face recognition processing (Step S4; NO, Step S5; YES), the control section 10 detects the position of the recognized face area as a reference position P which indicates a direction of the audience A (Step S6), and makes a shift to the processing of Step S8.

In Step S6, for example, the control section 10 calculates a position of the center of gravity of the face area recognized from the imaged image, and detects the calculated position of the center of gravity as reference position P (Xp, Yp). The position of the face area to be the reference position P is not limited to the position of the center of gravity of the face area, and for example, the center (position at which diagonal lines of a rectangular area circumscribing the face area intersect with each other) of the face area or the like can be used. By Step S6, the direction of the face area recognized from the imaged image can be detected as the direction of the audience A.

When two or more face areas are recognized as the result of the face recognition processing (Step S4; NO, Step S5; NO), the control section 10 regards the center of the imaged image as "R", detects the position of the face area nearest "R" as the reference position P (Step S7), and makes a shift to the processing of Step S8.

Figure 7:
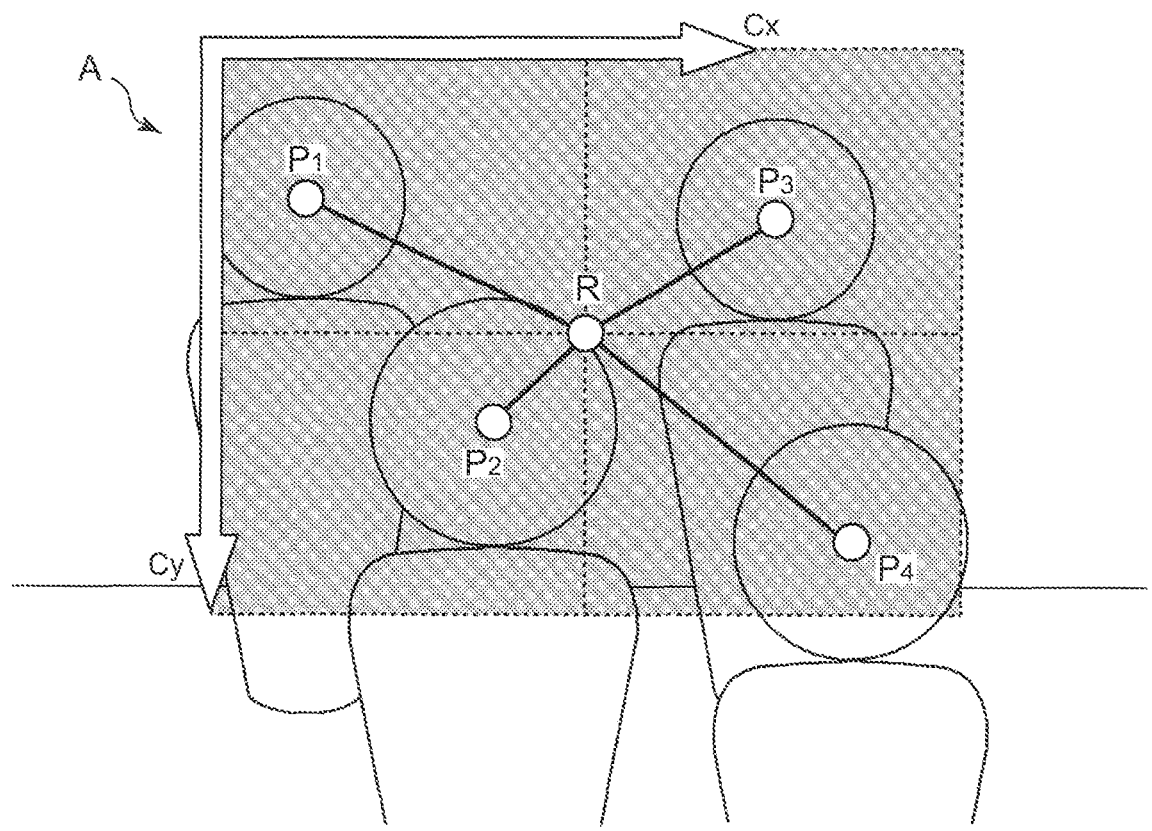
FIG. 7 is a diagram for explaining a method for determining a reference position P in the case that a plurality of face areas are detected.

For example, the control section 10 calculates the position of each face area recognized by the face recognition processing, and as illustrated in FIG. 7, the calculated positions are assumed, in the order of recognition, as P1(Xp1, Yp1), P2(Xp2, Yp2), P3(Xp3, Yp3), . . . . Then, the center of the imaged image is set as $R=(X_{max}/2, Y_{max}/2)$, and the coordinates of the position of the face area, for which "d" represented by the following [formula 1] becomes minimum, is detected as coordinate P(Xp, Yp) of the reference position P.

$$d=(X_{max}/2-Xpn)^2+(Y_{max}/2-Ypn)^2 \qquad \text{[formula 1]}$$

In this regard, however, n=1, 2, 3 . . .

In Step S8, the control section 10 calculates an angle t which indicates the direction of the reference position P (Step S8).

Figure 8:
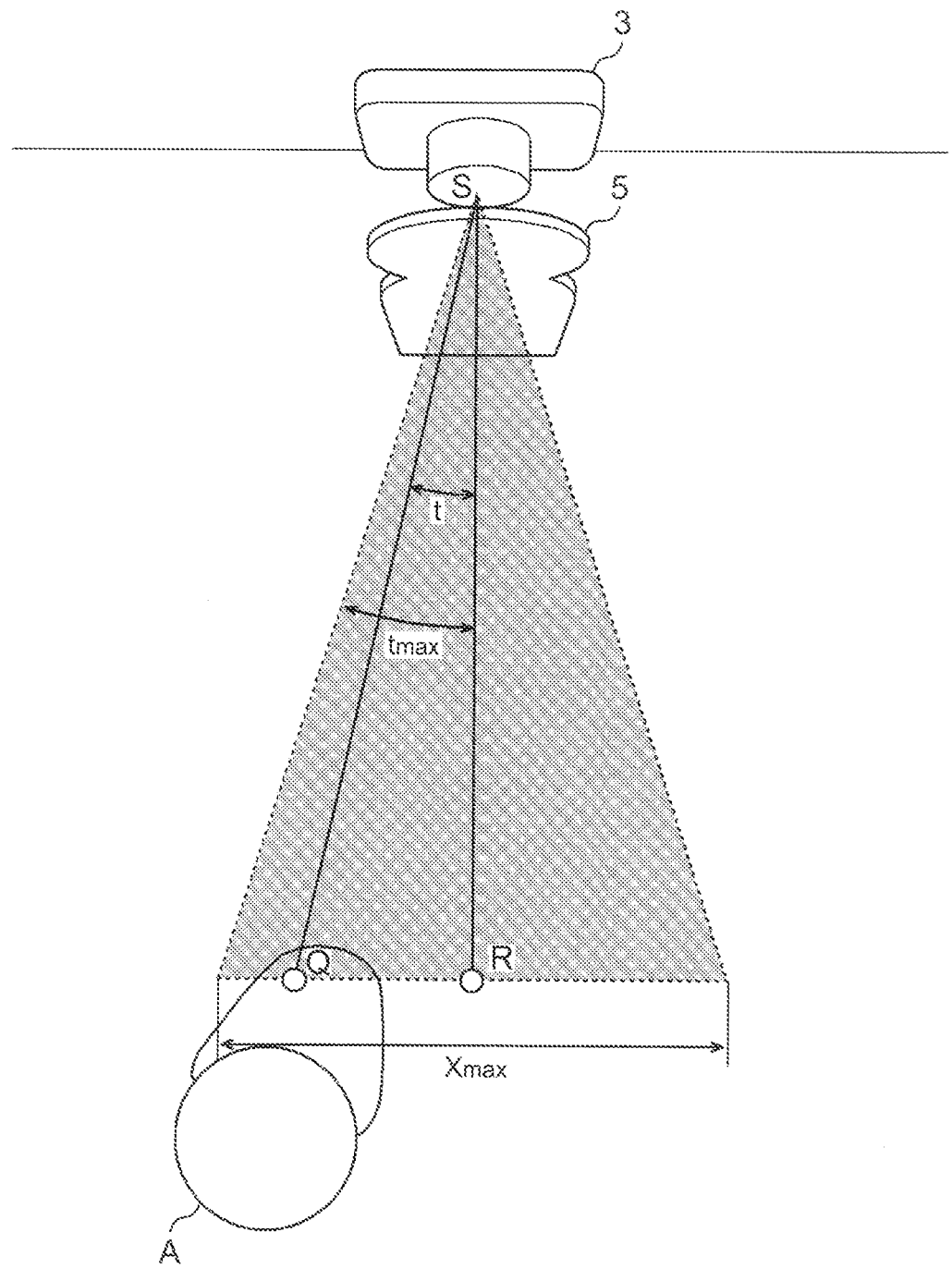
FIG. 8 is a diagram for explaining a method for calculating angle t.

As illustrated in FIG. 8, the angle t is an angle formed by the optical axis direction of the camera 3 and the direction of the reference position P. Specifically, when defining a vertex Q as $(Xp, Y_{max}/2)$ (see FIG. 5), the angle t is angle QSR formed by straight line QS and straight line SR. In this regard, however, t>0 when $Xp>X_{max}/2$, and t<0 when $Xp<X_{max}/2$. In other words, |t|=angle QSR.

When defining the angle t in the case of $Xp=X_{max}$ as $t=t_{max}$, and defining the angle t in the case of $Xp=0$ as $t=-t_{max}$, the angle t can be represented by the following [formula 2].

$$t=\arctan[(2Xp-X_{max})/\{X_{max}\cdot\tan(t_{max})\}] \qquad \text{[formula 2]}$$

The control section 10 calculates the angle t on the basis of [formula 2].

Next, the control section 10 performs rotation processing of the projection image read out in Step S1 on the basis of the calculated angle t (Step S9).

By rotating the projection image by the following rotation angle around the following rotation axis, when projecting the projection image on the screen 5, the projected image can be oriented in the direction of P in the camera coordinate of the imaged image.

Rotation angle: Wy direction

Rotation axis: −t

For example, in the case that the projection image is a polygon, the projection image is composed of a point group (a group of plural vertices). Here, the point group is defined as V1, V2, . . . Vn (n is the number of vertices). In the point group of V1, V2, . . . Vn, attention is paid to one(1) vertex Vk (1≤K≤n). When assuming that the coordinate value of Vk in the screen coordinate system is Vk=(Vx, Vy, Vz), and that Vk after rotation is Vk'=(Vx', Vy', VZ'), Vx, Vy, and Vz are converted into Vx', Vy' and Vz', respectively, by using the following [formula 3], [formula 4], and [formula 5].

$$Vx'=Vx\cdot\cos t - Vz\cdot\sin t \qquad \text{[formula 3]}$$

$$Vy'=Vy \qquad \text{[formula 4]}$$

$$VZ'=Vx\cdot\sin t + Vz\cdot\cos t \qquad \text{[formula 5]}$$

In rotation processing, by performing such conversion to all vertices in the projection image, the projection object contained in the projection image can be rotated so that the projected image of the video content to be projected on the screen 5 can be directed to the audiences A.

Incidentally, in the case that the projection image is not a polygon but a parametric surface or the like, by performing similar rotation processing to a control point, the projection image can be corrected so that the projected image of the video content to be projected on the screen 5 is directed to the audiences A.

In the processing of Step S10, the control section 10 transmits the projection image to the projector 2 through the I/F 14 so that the video content is projected on the screen 5 on the basis of the projection image (Step S10). Specifically, the control section 10 extracts an area of the projection object from the projection image, and transmits positional information of the extracted projection object together with the projection image to the projector 2 through the I/F 14. By this, the projector 2 can project only the projection object on the screen 5. Incidentally, the extraction of the projection object can be performed only by the projector 2.

Moreover, the control section 10 causes the sound output section 16 to convert audio data corresponding to the projection image into audio signals to output the audio from the speaker 4 (Step S11).

Next, the control section 10 judges whether or not next projection image exists in the video content (Step S12). When it is judged that the next projection image exists (Step S12; YES), the control section 10 returns to the processing of Step S1, and repeatedly executes the processing of Step S1 to Step S11. When it is judged that the next projection image does not exist (Step S12; NO), the control section 10 terminates the reproduction control processing.

As described above, in the first embodiment, since the orientation of the projected image to be projected on the screen 5 can be changed in real time depending on the position where the audiences A stand, three-dimensional projection of the video content becomes possible. Moreover, since the audiences A can feel as if the projected image (human being and the like) speaks to them, it becomes possible to bring a sense of affinity toward the projected image to them. Accordingly, persuasion of the video content is increased and thereby effective performance becomes possible.

[Second Embodiment]

Next, a second embodiment of the present invention will be described.

In the first embodiment, in the case that the plurality of face areas are recognized from the imaged image by the face recognition processing, the nearest face area to the center R of the imaged image is detected as the reference position P in the direction toward the audiences A. In the second embodiment, in the case that the plurality of face areas are recognized from the imaged image, the face areas are detected one by one as the reference position P, so that explanation is provided while the projected image of the video content looks at each of the audiences, who is in plural directions A, in turn.

To the control section 10 of the image processing apparatus 1 of the second embodiment, a timer (not illustrated) is connected. The other configurations of the content reproduction systems 100 and the apparatuses/devices constituting the same is similar to those described in the first embodiment, so explanations thereof are omitted. Hereinafter, an operation of the second embodiment will be described.

FIG. 9 illustrates a flowchart of reproduction control processing B to be executed when the plurality of faces are recognized from the imaged image obtained by imaging the audiences. The reproduction control processing B is executed in cooperation with the CPU of the control section 10 and the programs stored in the program storages section 131.

For example, when the plurality of face areas are recognized in the face recognition processing of the reproduction control processing illustrated in FIG. 6, namely, when the result of Step S5 in FIG. 6 is NO, this reproduction control processing B can be performed instead of making a shift to Step S7. There can also be adopted the configuration where a user can set whether to make the shift to Step S7 (namely, to cause the projected image to be directed to the face nearer the center) or to execute the reproduction control processing B (namely, to cause the projected image to be directed to each of the faces in turn) in the operation section 11. Incidentally, after terminating the reproduction control processing B, the processing is terminated without making a shift to Step S8 in FIG. 6.

Since the screen coordinate system and the camera coordinate system of the second embodiment are similar to those of the first embodiment, the explanations of the first embodiment are employed herein.

In the reproduction control processing B, firstly, the control section 10 detects the position of the nearest face area to the center R of the imaged image, among the plurality of face areas recognized from the imaged image of the audiences A which has been imaged by the camera 3, as the reference position P indicating the direction of the audiences A (Step S21). Incidentally, since calculation of the reference position P in Step S21 is similar to that of Step S7 in FIG. 6, the explanation of Step S7 is employed herein.

Next, the control section 10 calculates the angle t indicating the direction of the reference position P (Step S22). Since calculation of the angle t is similar to that of Step S8 in FIG. 8, the explanation of Step S8 is employed herein.

Then, the control section 10 performs rotation processing of the projection image of the projection object on the basis of the calculated angle t (Step S23). Since the rotation processing of the projection image is similar to that of Step S9 in FIG. 6, the explanation of Step S9 is employed herein.

Next, the control section 10 transmits the projection image to the projector 2 through the I/F 14 so that the video content is projected on the screen 5 on the basis of the projection image (Step S24). Specifically, the control section 10 extracts the area of the projection object from the projection image, and transmits the positional information of the extracted projection object to the projector 2 via the I/F 14, together with the projection image. By this, projector 2 can project only the projection object on the screen 5. Incidentally, extraction of the projection object can be performed also by the projector 2.

Furthermore, the control section 10 causes the audio output section 16 to convert the audio data corresponding to the projection image into the audio signal to output the same from the speaker 4 (Step S25).

The control section 10 then sets a predetermined specified time T (second) in a timer, and causes the timer to start timing (Step S26). Here, if the direction in which the projected image is oriented is fixed, there is possibility that projection does not become effective for the audiences A existing in the other directions. For this reason, this embodiment performs the control so that the direction in which the projected image is oriented is changed when the specified time T has passed. The timer times the specified time T.

After that, the control section 10 reads out the next projection image in the video content from the video data storage section 132 of the storage section 13 (Step S27).

Next, the control section 10 causes the camera 3 to image the audiences A looking at the screen 5 to obtain the imaged image of the audiences A (Step S28).

Then, the control section 10 executes the face recognition processing to the obtained imaged image (Step S29), and arranges the face areas, which have been recognized by the face recognition processing, in the order of closeness to the center R of the imaged image (Step S30).

Specifically, the control section 10 calculates each of the positions of the recognized face areas, calculates a distance d between the position of each face area and the center R of the imaged image on the basis of [formula 1], and arranges the face areas in ascending order of the distance d.

Next, the control section 10 judges whether or not the face area at the same position (namely; the same P) as the reference position P detected last time has been recognized (Step S31).

When it is judged that the face area at the same position as the reference position, P detected last time has been recognized (Step S31; YES), the control section 10 judges whether or not the specified time T in the timer has passed (Step S32). When it is judged that the specified time T in the timer has not passed (Step S32; NO), the control section 10 makes a shift to the processing of Step S36 without changing the reference position P.

On the other hand, when it is judged that the specified time T in the timer has passed (Step S32; YES), the control section 10 detects, as the next reference position P, the position of the face area in the imaged image, which face area is arranged next to the face area at the same position as the reference position P detected last time in Step S30 (Step S33), and makes a shift to the processing of Step S35. Incidentally, in the case that the face area at the reference position P detected last time is last in the order of the face areas arranged in Step S30, the position of the face area in the imaged image, which face area is first in the order, is detected as the next reference position P.

On the other hand, when it is judged that the face area at the same position as the previously-obtained reference position P has not been recognized (Step S31; NO), the control section 10 detects, as the next reference position P, the position of the nearest face area to the center R of the imaged image of the audiences A which has been imaged by the camera 3 (Step S34), and makes a shift to the processing of Step S35.

In Step S35, the control section 10 resets the timer, and starts measuring the specified time T (Step S35). The control section 10 then makes a shift to the processing of Step S36. Here, because the position (reference position P) of the face area, which is the reference of the direction in which the projected image is oriented, has been changed, the timer is reset so that the projected image oriented in the direction toward the face area can be displayed until the specified time T passes.

In Step S36, the control section 10 calculates the angle t indicating the direction of the reference position P on the basis of the detected reference position P (Step S36). The angle t is calculated by using [formula 2].

Next, the control section 10 corrects the angle t by P control (Step S37).

P control is also referred to as Proportional Control, by which a control proportional to deviation between a current value and a target value is performed. Here, P control is used so that the angle t gradually comes close to the target value thereof.

In Step S37, firstly, it is assumed that the angle t used in the rotation processing of immediately previous projection image is t1, and that the angle t (target value) of this time calculated in Step S36 is t2. Here, angle t' is obtained by using the following [formula 6].

$$t' = K(t2-t1)+t1 \quad (0<K<1)$$ [formula 6]

The obtained angle t' becomes t to be used in the rotation processing. Thus, by correcting the angle t, it becomes possible to make the angle t gradually come close to t2 every time process of Step S27 to Step S41 is repeated. In other words, the projection image can be corrected so that the projected image is gradually oriented in the direction (direction of the face corresponding to the reference position P) of the face targeted.

Here, K is a proportional gain in P control. The control can be performed so that the larger K is, the more promptly angle t comes close to the target angle, and so that the smaller K is, the more slowly angle t comes close to the target angle.

Next, the control section 10 performs the rotation processing of the projection image on the basis of the angle t which has been corrected in Step S37 (Step S38). The rotation processing is performed by using the above-described [formula 3] to [formula 5].

Then, the control section 10 transmits the projection image to the projector 2 through the I/F 14 so that the video content is projected on the screen 5 on the basis of the projection image (Step S39). Specifically, the control section 10 extracts the area of the projection object from the projection image, and transmits the positional information of the extracted projection object to the projector 2 by the I/F 14, together with the projection image. By this, the projector 2 can project only the projection object on the screen 5. Incidentally, extraction of the project object can also be performed by the projector 2.

Moreover, the control section 10 causes the audio output section 16 convert the audio data corresponding to the projection image into the audio signal to output the same from the speaker 4 (Step S40).

Next, the control section 10 judges whether or not the next projection image exists in the video content (Step S41). When it is judged that the next projection image exists (Step S41; YES), the control section 10 returns to the processing of Step S27, and repeatedly executes the processing of Step S27 to Step S40 to the next projection image. When it is judged that the next projection image does not exist (Step S41; NO), the control section 10 terminates the reproduction control processing B.

According to the second embodiment, there can be obtained the configuration where the projected image is directed not only to one(1) location but also successively oriented in the plurality of directions in which the audiences A exist while providing explanation and the like. This can bring a sense of affinity toward the projected image to more people constituting the audiences A, and can enhance persuasiveness of explanation by the projected image. In other words, it becomes possible to more effectively project the projection video contents.

In the case of changing the direction (position of P) in which the projected image is oriented, by correcting the angle t by P control, the orientation of the projected image is not suddenly changed and can be gradually changed, and thereby projection can be performed without bringing a feeling of strangeness.

As described above, according to the image processing apparatus 1 of the content reproduction system 100, the control section 10 causes the camera 3 to take the image of the audiences A looking at the screen 5, detects the reference position P which indicates the direction of the audiences A from the obtained imaged image, and corrects the projection image so that the projected image of the video content, which image is projected on the screen 5, is directed to the audiences A, on the basis of the detected direction of the reference position P.

Accordingly, because the orientation of the projected image which is projected on the screen 5 can be changed in real time depending on the positions where the audiences A are standing, the three-dimensional projection of the video content becomes possible. In addition, because the audiences A feel as if the projected image (human being etc.) speaks to them, it becomes possible to bring a sense of affinity toward the projected image to the audiences A. As a result, effective performance such as improved persuasion of the video content becomes possible.

For example, the control section 10 can execute the face recognition processing to the imaged image obtained by the camera 3, and can detect the reference position P of the direction of the audiences A on the basis of the face areas recognized by the face recognition processing.

Moreover, for example, the control section 10 can calculate the angle t formed by the optical axis direction of the camera 3 and the direction of the reference position P, and can correct the projection image by executing the rotation processing to the projection image on the basis of the calculated angle t.

In the case that the plurality of face areas are recognized by the face recognition processing, the control section 10 detects, as the direction of the audience A, the directions of the recognized face areas one by one in the predetermined order, for example, in the order of closeness of the face areas to the center of the imaged image. Thus, because the orientation of the projected image is not fixed to only one(1) location and can be changed to the plurality of directions in which the audiences A exist, even when the audiences A exist in the plurality of directions respectively, it becomes possible to bring a sense of affinity toward the projected image to more people looking at the projected image. Accordingly, effective performance such as improved persuasion of the video content becomes possible.

Moreover, the control section 10 detects the next face area as the reference position P which indicates the direction of the audience A, in the case that the predetermined specified time T has passed since the position of the one(1) recognized face area has been detected as the reference position P to be the reference of the direction of the audience A. When the audiences A exist in the plurality of directions respectively, the orientation of the projected image is not fixed and changed to the other direction when the specified time T has passed.

Furthermore, in the case that the detected reference position P changes, the control section 10 corrects the projection image so that the orientation of the projected image gradually comes close to the reference position P, by gradually changing the angle t which specifies the direction of the reference position P. Thus, the orientation of the projected image is not suddenly changed and can be gradually changed, and projection can be performed without bringing a feeling of strangeness.

Moreover, in the case that the plurality of face areas are recognized by the face recognition processing, the position of the nearest face area to the center of the imaged image can be detected as the reference position P which indicates the direction of the audiences A. By this, a sense of affinity toward the projected image can be brought to more people without changing the orientation of the projected image, and effective projection becomes possible.

In the case that the one(1) face area is recognized by the face recognition processing, the position of the recognized face area is detected as the reference position P which indicates the direction of the audiences A. By this, a sense of affinity toward the projected image can be brought to the audience A, and effective projection becomes possible.

Furthermore, by making the screen 5 formed into the shape of the projection object of the video content, the projected image having a presence as if a human being is standing there can be obtained.

Incidentally, the description contents of the above embodiments are mere preferred examples of the content reproduction system according to the present invention, and the present invention is not limited thereto.

For example, though the image processing apparatus 1 and the projector 2 are described as different forms in the above embodiments, they can also be integrally formed. Concretely, there can be adopted the configuration where the projector 2 is contained in the image processing apparatus 1, and the projector 2 corrects the above-described projection image and performs the projection on the screen 5 on the basis of the corrected projection image.

Moreover, though the configuration where the rear surface of the screen 5 is directly irradiated with light output from the projector 2 is described in the above embodiments, it is also possible to provide a mirror on which the light output from the projector 2 is reflected, and to project the reflected light from the mirror on the rear surface of the screen 5.

Furthermore, though the example where the screen 5 is formed into the shape of the projection object is described in the above embodiments, the present invention is not limited thereto. For example, the present invention can be applied to the case where the video content is projected on a screen having a general shape such as a rectangular shape.

The definitions of the screen coordinate system and the camera coordinate system are mere examples, and the present invention is not limited thereto.

Moreover, though the case of using the projection image of a three-dimensional model as the video content is described in the above embodiments, the projection image obtained by taking an image of the projection object such as human being can also be used. This case can be actualized by displacing a central axis of the projection object in the projection image depending on the detected direction of the audiences A, and by enlarging or reducing sizes of parts (for example, eyes, nose, mouth, ears, etc.) of the projection object depending on a width between the central axis and an outline thereof.

Furthermore, though the example of the case that imaging of the audiences A by the camera, detection of the reference position P, and correction of the projection image based on the reference position P are performed with respect to each frame, the present invention is not limited thereto, and these processes can be performed with respect to plural frames.

Moreover, though there is described in the first embodiment the case of detecting the reference position P of the direction of the audiences A on the basis of the nearest face area to the center R of the imaged image when the plurality of face areas are recognized from the image imaged by the camera 3, the present invention includes also the case of detecting the reference position P of the direction of the audiences A on the basis of the other face areas.

Furthermore, though the camera 3 detects the direction of the audiences A in the above embodiments, the present invention is not limited thereto and can use a sensor, such as a Laser Range Scanner/3D scanner, which can detect the direction of the audiences A.

Moreover, though the second embodiment executes the control to make the orientation of the projected image gradually changed by P control, the present invention can use also PI control or PID control. P control enables more rapid processing than that of PI control and PID control. Meanwhile, PI control and PID control enable the control with higher accuracy.

Furthermore, though the projected image faces to the face areas one by one in the order of closeness to the center R of the imaged image in the second embodiment, the order is not limited thereto. For example, the present invention includes also the case where firstly the projected image is oriented in the direction of the nearest face area to the center R in the imaged image, and then is directed to the other face areas one by one in a counterclockwise direction. When the orientation of the projected image changes, the projected image can be directed to furthest face area.

Moreover, though the video data of the video content is stored in the storage section 13 in the above embodiments, there can be adopted a configuration where the video data is delivered from a server connected to the image processing apparatus 1 via a communication network. Also a configuration where the video data are taken from a USB memory and/or various kinds of recording media can be adopted.

Furthermore, as a computer readable medium storing programs for executing the above processing, in addition to the ROM, the hard disk, etc., also a non-volatile memory such as a flash memory and a portable recording medium such as a CD-ROM can be adopted. As a medium for providing data of programs via a predetermined communication line, also carrier wave can be adopted.

Also the detailed configurations and operations of the apparatuses constituting the content reproduction system can be properly changed within a range which does not depart from the spirit of the present invention.

What is claimed is:

1. An image processing apparatus comprising:
a storage section that stores a projection image to be used for projecting a video content on a screen;
an imaging section that images an audience looking at the screen;
a detecting section that detects a direction of the audience from an imaged image which is imaged by the imaging section; and
a correcting section that corrects the projection image, based on the direction of the audience, such that a projected image of the video content is directed to the audience,
wherein the detecting section includes a face recognition processing section to recognize a face area from the imaged image, and detects the direction of the audience based on the face area, and
wherein when the face recognition processing section recognizes a plurality of face areas, the detecting section detects directions of the recognized face areas, one by one, in a predetermined order as the direction of the audience.

2. The image processing apparatus according to claim 1, wherein the predetermined order is an order of closeness of the face areas to a center of the imaged image.

3. The image processing apparatus according to claim 1, wherein the detecting section detects a direction of a next face area as the direction of the audience, after a predetermined specified time has passed since a direction of a previous face area from among the face areas has been detected as the direction of the audience.

4. The image processing apparatus according to claim 1, wherein the correcting section corrects the projection image such that the projected image of the video content, which is projected based on the projection image, is gradually oriented in the direction of the audience, when the direction of the audience changes.

5. The image processing apparatus according to claim 1, wherein when the face recognition processing section recognizes the plurality of face areas, the detecting section detects a direction of a face area nearest to a center of the imaged image as the first direction of the audience in the predetermined order.

6. The image processing apparatus according to claim 1, wherein when the face recognition processing section recognizes one face area, the detecting section detects a direction of the face area as the direction of the audience.

7. The image processing apparatus according to claim 1, wherein the screen is a screen formed into a shape of a projection object of the video content.

8. The image processing apparatus according to claim 1, wherein the correcting section calculates an angle formed by an optical axis of the imaging section and the detected direction of the audience, and corrects the projection image by performing rotation processing to the projection image based on the angle.

9. A projection apparatus comprising:
a storage section that stores a projection image to be used for projecting a video content on a screen;
an imaging section that images an audience looking at the screen;
a detecting section that detects a direction of the audience from an imaged image which is imaged by the imaging section;
a correcting section that corrects the projection image, based on the direction of the audience, such that a projected image of the video content, which is projected on the screen, is directed to the audience, and
a projecting section that projects the video content on the screen based on the corrected projection image,
wherein the detecting section includes a face recognition processing section to recognize a face area from the imaged image, and detects the direction of the audience based on the face area, and
wherein when the face recognition processing section recognizes a plurality of face areas, the detecting section detects directions of the recognized face areas, one by one, in a predetermined order as the direction of the audience.

10. A non-transitory computer readable storage medium having a program stored thereon which is executable to control a computer to execute processes comprising:
storing a projection image to be used for projecting a video content on a screen;
detecting a direction of an audience from an imaged image obtained by imaging an audience looking at the screen; and
correcting the projection image, based on the direction of the audience detected by the detecting process, such that a projected image of the video content, which is projected on the screen, is directed to the audience,
wherein the detecting process includes recognizing a face area from the imaged image, and detecting the direction of the audience based on the face area, and
wherein when the detecting process recognizes a plurality of face areas, the detecting process further includes detecting directions of the recognized face areas, one by one, in a predetermined order as the direction of the audience.

* * * * *